(12) United States Patent
Hoyle

(10) Patent No.: US 10,495,251 B2
(45) Date of Patent: Dec. 3, 2019

(54) ADJUSTABLE SUPPORT BRACKET FOR SELF-LEVELING DEVICE

(71) Applicant: Gary C. Hoyle, Cumming, GA (US)

(72) Inventor: Gary C. Hoyle, Cumming, GA (US)

(73) Assignee: G.C. Hoyle Company LLC, Cumming, GA (US)

( * ) Notice: Subject to any disclaimer, the term of this patent is extended or adjusted under 35 U.S.C. 154(b) by 80 days.

(21) Appl. No.: 15/869,172

(22) Filed: Jan. 12, 2018

(65) Prior Publication Data

US 2019/0219222 A1    Jul. 18, 2019

(51) Int. Cl.
  *F16M 11/16*    (2006.01)
  *F16M 11/20*    (2006.01)

(52) U.S. Cl.
  CPC ......... *F16M 11/2021* (2013.01); *F16M 11/16* (2013.01); *F16M 2200/041* (2013.01)

(58) Field of Classification Search
  CPC ............... F16M 11/2021; F16M 11/16; F16M 2200/041; F16M 11/38
  USPC .................................. 248/188, 121; 182/153
  See application file for complete search history.

(56) References Cited

U.S. PATENT DOCUMENTS

| 6,681,895 B2 * | 1/2004 | Virtue | B25H 1/06 |
| | | | 182/153 |
| 9,453,608 B2 * | 9/2016 | Hoyle | A47B 3/06 |
| 2005/0045422 A1 * | 3/2005 | Remmers | B25H 1/06 |
| | | | 182/153 |

* cited by examiner

*Primary Examiner* — Todd M Epps
(74) *Attorney, Agent, or Firm* — Frost Brown Todd LLC

(57) ABSTRACT

An adjustable support bracket assembly that includes a first section having a first inner support bracket having a stem and flange receiving region formed therein; a center support section formed integrally with the first inner support bracket that further includes a first locking edge opposite the a first inner support bracket; and a first outer support bracket adapted to be attached to the first inner support bracket that also includes a stem and flange receiving region formed therein; and a second section, detachably connected to the first section that includes a second inner support bracket, having a stem and flange receiving region formed therein; a center support section formed integrally with the second inner support bracket that further includes a second locking edge formed thereon opposite the second inner support bracket; and a second outer support bracket adapted to be attached to the second inner support bracket that also includes a stem and flange receiving region formed therein.

20 Claims, 5 Drawing Sheets

ADJUSTABLE SUPPORT BRACKET FOR SELF-LEVELING DEVICE

BACKGROUND OF THE INVENTION

The described invention relates in general to tables, platforms, benches, chairs, stands, and other substantially flat or planar surfaces of various shapes that include foldable, collapsible, or otherwise adjustable legs or support structures, and more specifically to an adjustable support bracket for use with such devices.

Substantially flat or planar platforms are common utilitarian components found in many items including tables; benches; chairs; cooking surfaces; work surfaces; elevated storage containers; hunting, fishing, and camping products; and many others. Most of these platforms are most useful when they are in a level position (i.e., positioned horizontally). However, placing and holding a substantially flat or planar platform in a level position can be challenging, particularly when the surface or substrate upon which the platform is placed is uneven. In restaurants, coffee shops, and other establishments, encountering tables or chairs that wobble or tilt, or that are otherwise unstable is a common and annoying occurrence for many people. An unstable table or chair is also more likely to collapse or fall over, thereby creating a risk of injury to the person using the item. Furthermore, an unstable work platform may present a significant safety hazard, particularly if the platform is being used for activity that involves sawing or other reciprocating motion that would encourage the work platform to tip over or collapse. Legs or other support structures attached to such platforms may be collapsible, foldable, or adjustable with regard to height and/or angle relative to the platform itself; however, these support structures are not typically adjustable with regard to maintaining the platform in a level position when the platform is sitting on an uneven substrate.

Self-adjusting support assemblies for use on uneven substrates or surfaces are described in U.S. Pat. Nos. 9,140,401 and 9,453,608, which are incorporated herein by reference, in their entirely, for all purposes. U.S. Pat. Nos. 9,140,401 and 9,453,608 both teach a self-adjusting support assembly for use on uneven surfaces that includes: (a) a support element (e.g., a platform, work surface, tabletop, or seat); (b) at least one pivoting leg assembly positioned beneath the support element; and (c) at least one self-adjusting attachment assembly connecting the support element to the at least one pivoting leg assembly. Each self-adjusting attachment assembly includes: (i) a bracket that is adapted to attach to the support element; and (ii) a proximal head portion that is adapted to rotationally cooperate with the bracket and to receive the pivoting leg assembly. The bracket includes: (i) a receiving channel formed therein that is positioned along a predetermined angled axis of insertion; and (ii) locking ridge positioned within the receiving channel. The proximal head portion includes: (i) a flange formed at one end thereof that rotationally engages the locking ridge; (ii) a stem positioned beneath the flange that rotationally engages the receiving channel; and (iii) a receiving portion positioned beneath the stem that is adapted to receive the pivoting leg assembly.

The self-adjusting attachment assemblies taught by U.S. Pat. Nos. 9,140,401 and 9,453,608 can be attached to and effectively used with almost any type of platform, and many types of pre-existing devices (tables, benches, chairs, etc.) can be modified by retrofitting to include the self-adjusting attachment assemblies and the pivoting leg assemblies with which the self-adjusting attachment assemblies are designed to work. However, the size, geometry, and weight of the platform to which the attachment assemblies and pivoting legs are attachment may require variable spacing between attachment assemblies for the sake of overall device balance and stability. Accordingly, there is a need for an adjustable support bracket for use with the self-leveling devices described in U.S. Pat. Nos. 9,140,401 and 9,453,608.

SUMMARY OF THE INVENTION

The following provides a summary of certain exemplary embodiments of the present invention. This summary is not an extensive overview and is not intended to identify key or critical aspects or elements of the present invention or to delineate its scope. However, it is to be understood that the use of indefinite articles in the language used to described and claim the present invention is not intended in any way to limit the described system to single components or elements. Rather the use of "a" or "an" herein should be interpreted as meaning "at least one" or "one or more".

In accordance with one aspect of the present invention, a first adjustable support bracket assembly is provided. This adjustable support bracket assembly includes a first section, wherein the first section includes: a first inner support bracket that further includes a stem and flange receiving region formed therein; a center support section formed integrally with the first inner support bracket that further includes a first locking edge formed thereon opposite the first inner support bracket; and a first outer support bracket that is adapted to be attached to the first inner support bracket and further includes a stem and flange receiving region formed therein; and a second section, detachably connected to the first section, that includes a second inner support bracket that further includes a stem and flange receiving region formed therein; a center support section formed integrally with the second inner support bracket that further includes a second locking edge formed thereon opposite the second inner support bracket; and a second outer support bracket that is adapted to be attached to the second inner support bracket and that further includes a stem and flange receiving region formed therein.

In accordance with another aspect of the present invention, a second adjustable support bracket assembly is provided. This adjustable support bracket assembly is for use with self-leveling devices and includes a first section having a first inner support bracket that further includes a stem and flange receiving region formed therein; a center support section formed integrally with the first inner support bracket that further includes a lengthwise structural support formed thereon and a first locking edge formed thereon opposite the first inner support bracket; and a first outer support bracket, wherein the first outer support bracket is adapted to be attached to the first inner support bracket and further includes a stem and flange receiving region formed therein; and a second section, detachably connected to the first section, wherein the second section includes a second inner support bracket that further includes a stem and flange receiving region formed therein; a center support section formed integrally with the second inner support bracket that further includes a lengthwise structural support formed thereon and a second locking edge formed thereon opposite the second inner support bracket that is adapted to engage the first locking edge in a stable or stabilizing manner; and a second outer support bracket that is adapted to be attached to the second inner support bracket and that further includes a stem and flange receiving region formed therein.

In yet another aspect of this invention, a third adjustable support bracket assembly is provided. This adjustable support bracket assembly includes a first section, wherein the first section is metal or plastic and includes a first inner support bracket that further includes a stem and flange receiving region formed therein; a center support section formed integrally with the first inner support bracket that further includes a first locking edge formed thereon opposite the first inner support bracket; and a first outer support bracket that is adapted to be attached to the first inner support bracket, and that further includes a stem and flange receiving region formed therein; and a second section, detachably connected to the first section, wherein the second section is metal or plastic and includes a second inner support bracket that further includes a stem and flange receiving region formed therein; a center support section formed integrally with the second inner support bracket that further includes a second locking edge formed thereon opposite the second inner support bracket; and a second outer support bracket, wherein the second outer support bracket is adapted to be attached to the second inner support bracket and further includes a stem and flange receiving region formed therein, and wherein the stem and flange receiving portions formed in the inner and outer support brackets are adapted to receive a rotating and pivoting leg assembly that includes a pivot device, that further includes an elongated stem, and a flange formed atop the elongated stem.

Additional features and aspects of the present invention will become apparent to those of ordinary skill in the art upon reading and understanding the following detailed description of the exemplary embodiments. As will be appreciated by the skilled artisan, further embodiments of the invention are possible without departing from the scope and spirit of the invention. Accordingly, the drawings and associated descriptions are to be regarded as illustrative and not restrictive in nature.

BRIEF DESCRIPTION OF THE DRAWINGS

The accompanying drawings, which are incorporated into and form a part of the specification, schematically illustrate one or more exemplary embodiments of the invention and, together with the general description given above and detailed description given below, serve to explain the principles of the invention, and wherein.

DETAILED DESCRIPTION OF THE INVENTION

Figure 1:
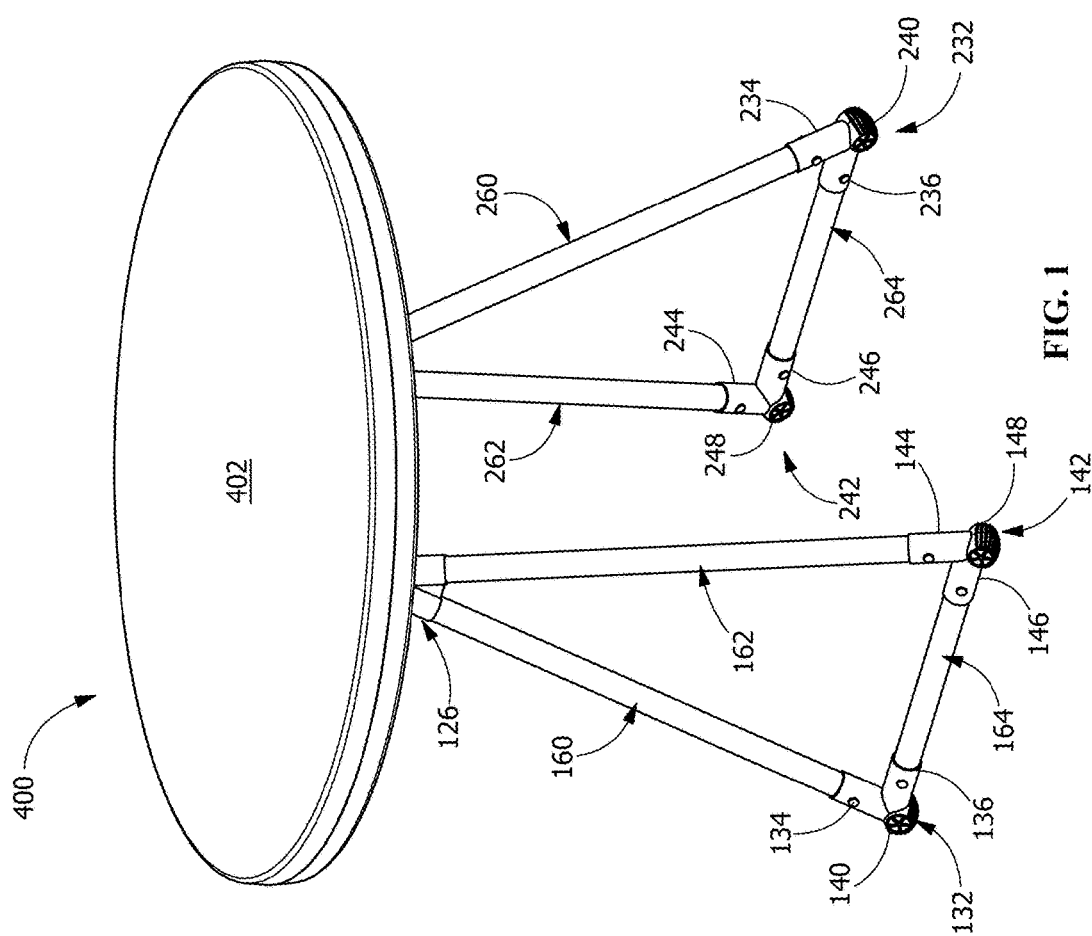
FIG. 1 is a top perspective view of an adjustable, self-leveling device, wherein two triangular pivoting and rotating leg assemblies have been attached to a substantially flat platform having a generally circular geometry.

Exemplary embodiments of the present invention are now described with reference to the Figures. Reference numerals are used throughout the detailed description to refer to the various elements and structures. Although the following detailed description contains many specifics for the purposes of illustration, a person of ordinary skill in the art will appreciate that many variations and alterations to the following details are within the scope of the invention. Accordingly, the following embodiments of the invention are set forth without any loss of generality to, and without imposing limitations upon, the claimed invention.

The present invention provides an adjustable support bracket/bracket assembly for use with the self-leveling devices described in U.S. Pat. Nos. 9,140,401 and 9,453,608 and other systems and devices. The STABLZ® family of products provides various platforms that are supported by sets of triangular legs that operative to "self-level" these platforms on uneven substrates. Within the context of this invention and in describing the STABLZ® products generally, the phrase "self-leveling" refers to the mechanical relationship between the platform, the legs (which are typically, but not necessarily, triangular) that support the platform, and the bracket assembly that attaches the legs to the platform. The bracket assembly receives and houses the legs in a manner that permits the upper portion of the legs to rotate and pivot, independent of one another, thereby permitting a user of the device to orient the platform in a level position even if the bottom portions of the legs are resting on an uneven substrate or surface. Because the platforms used with this system can vary in size, weight, and shape, it may be desirable to increase the physical distance between the rotating, pivoting legs to achieve greater overall stability. This is particularly true when retrofitting a preexisting platform, such as a table used in a restaurant, with the mechanical system described herein.

Figure 2:
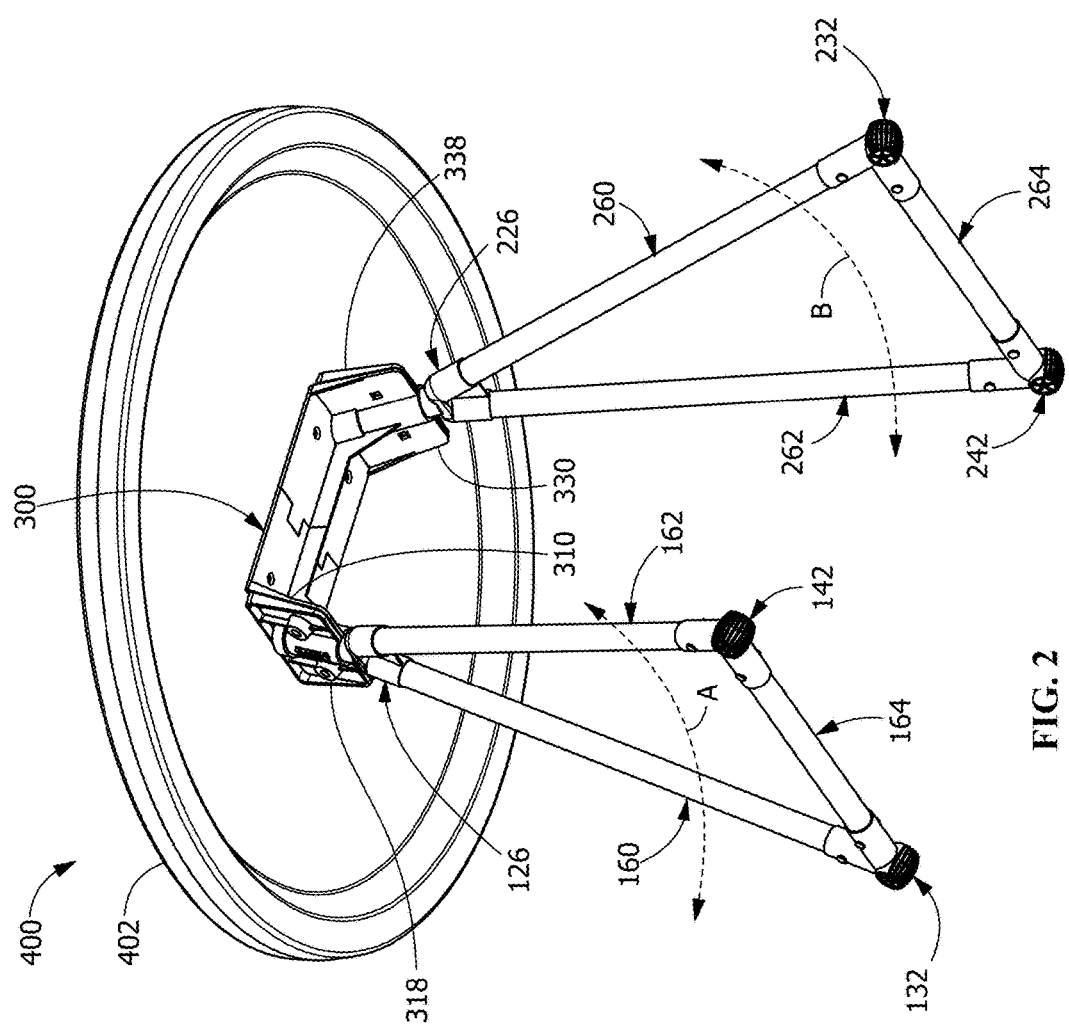
FIG. 2 is a bottom perspective view of the device of FIG. 1, showing the placement of an adjustable support bracket in accordance with an exemplary embodiment of the present invention, wherein the adjustable support bracket has been mounted on the underside of the platform, and wherein the adjustable support bracket is adapted to both support the platform and receive and mechanically engage the pivoting and rotating leg assemblies.
Figure 3:
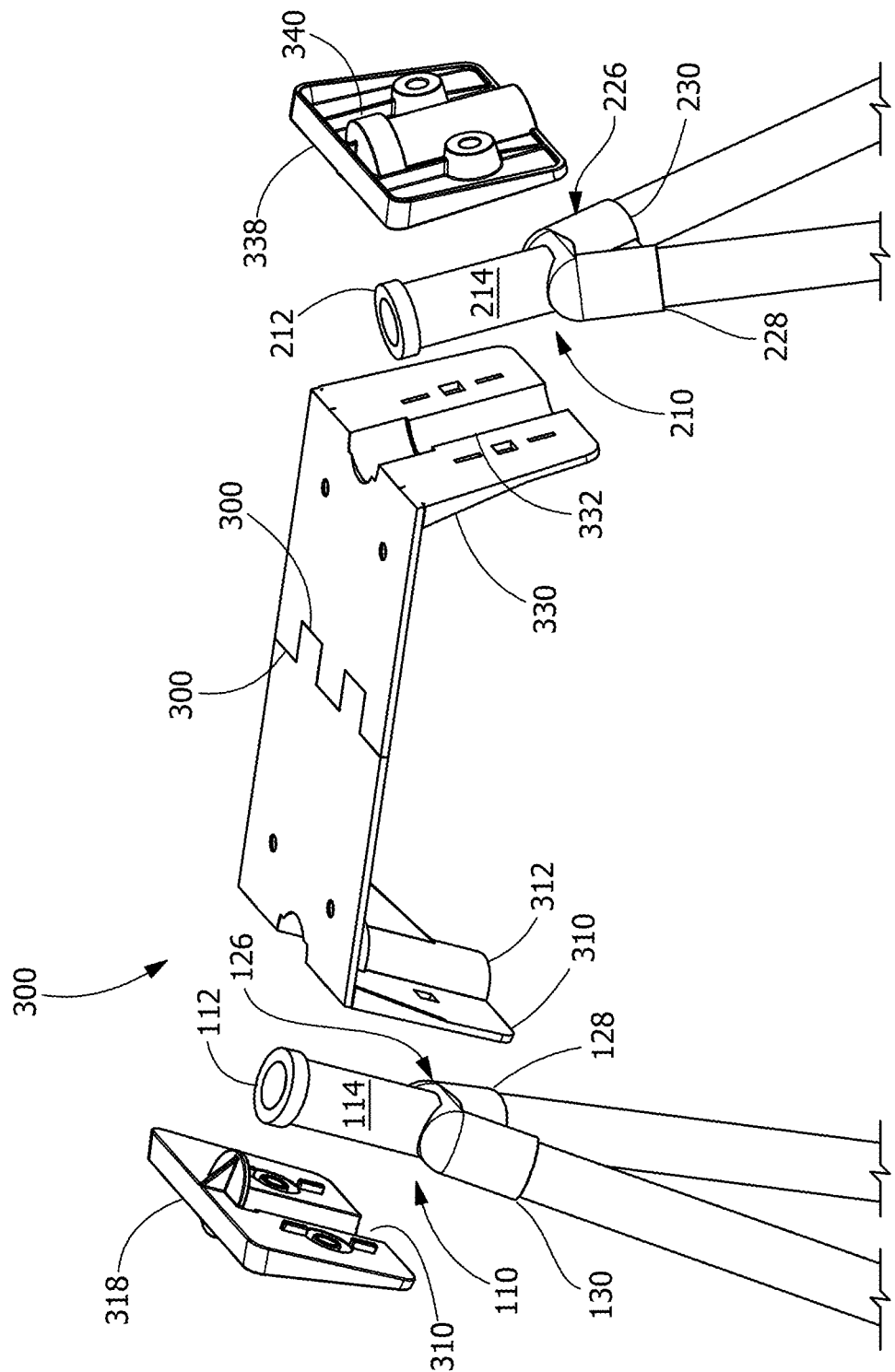
FIG. 3 is an exploded, top perspective view of the adjustable support bracket of FIG. 2, wherein the bracket has been removed from the platform, and wherein the outer bracket portions have been removed to illustrate the proper placement of the top portions of the leg assemblies within the adjustable support bracket.
Figure 4:
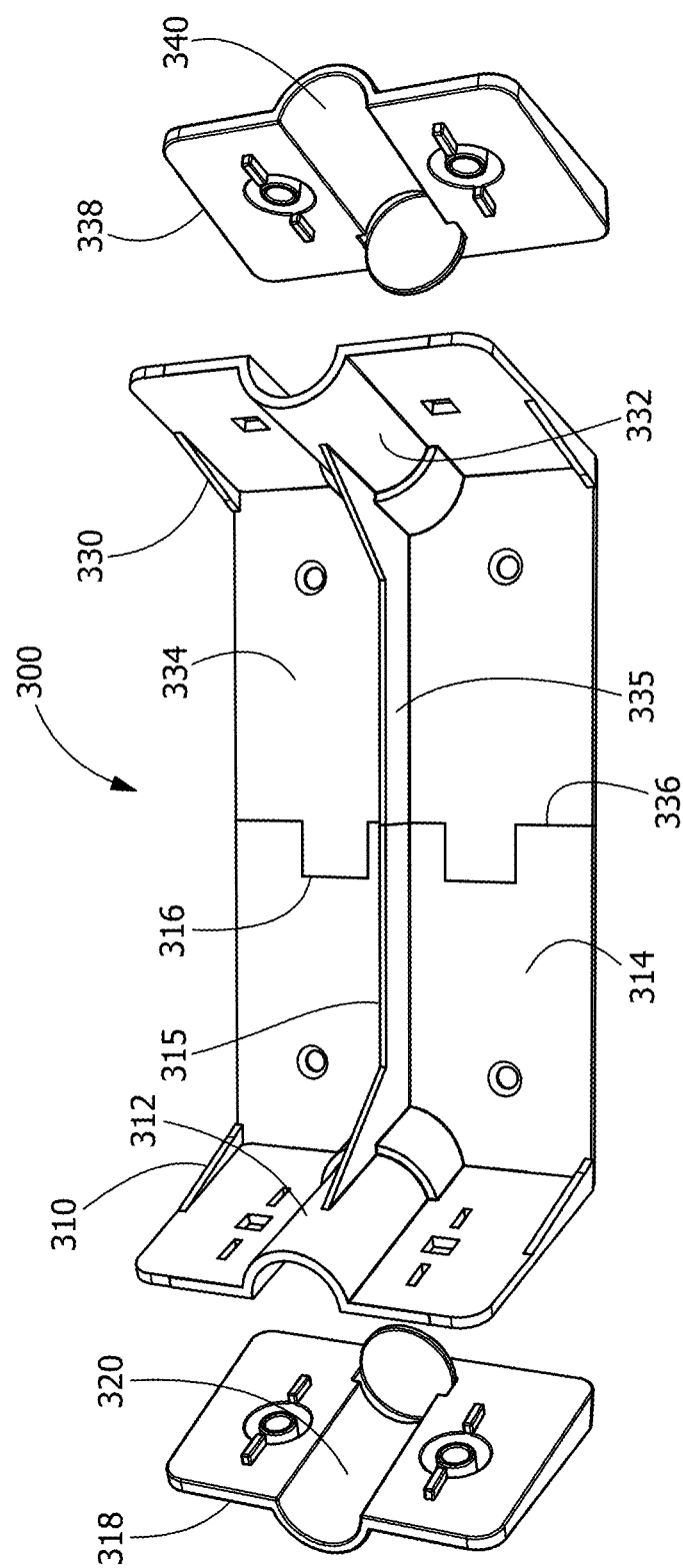
FIG. 4 is an exploded, bottom perspective view of the adjustable support bracket of FIG. 3, wherein the outer bracket portions have been removed and the inner bracket portions are shown in a joined position.
Figure 5:
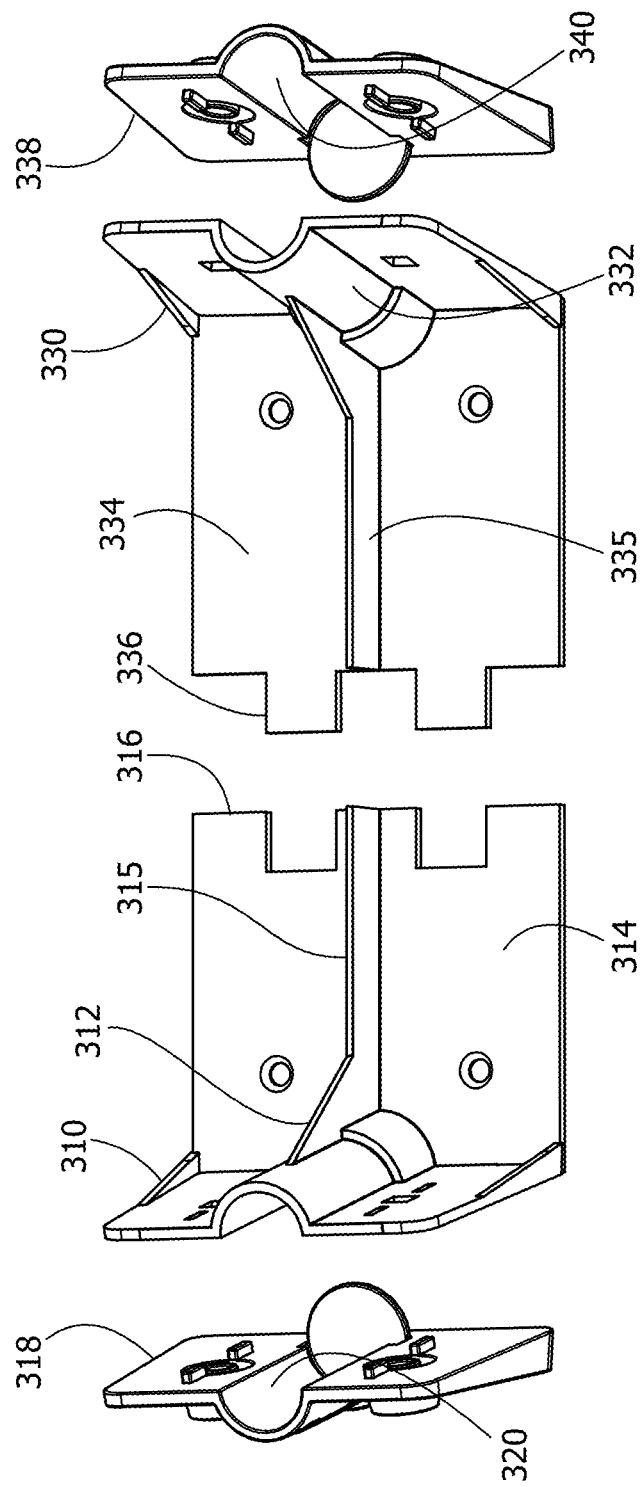
FIG. 5 is an exploded, bottom perspective view of the adjustable support bracket of FIG. 3, wherein the outer bracket portions have been removed and the inner bracket portions are shown separated from one another.

With reference now to FIGS. 1-5, FIGS. 1-2 are illustrations of an exemplary embodiment of adjustable support bracket assembly 300 being used to attached first and second support assemblies 100 and 200 to round table top 400, which includes top surface 402 and bottom surface 404 (upon which bracket assembly 300 is mounted). FIGS. 3-4 show a configuration of adjustable support bracket assembly 300 wherein the two halves of the bracket assembly are joined, and FIG. 5 shows a configuration of adjustable support bracket assembly 300 wherein the two halves of the bracket assembly are separated to increase, in a flexible and changeable manner, the distance between support assemblies 100 and 200 as necessary to provide increased stability to the entire table/leg construct. Adjustable support bracket assembly 300 may be manufactured from metal, plastic, or any other suitably durable material.

As best shown in FIGS. 2-3, first support assembly 100 includes first pivot device 110 that further includes flange 112, which is positioned on the top of stem 114, and leg receptacle 126 that includes first and second leg receiving portions 128 and 130, respectively. First support assembly 100 also includes first corner piece 132 that further includes leg receiving portion 134, crossbar receiving portion 136, and foot 140; and second corner piece 142, that further includes leg receiving portion 144, crossbar receiving portion 146, and foot 148. First support assembly 100 also includes first leg 160, second leg 162, and crossbar 164. Second support assembly 200 includes second pivot device 210 that further includes flange 212, which is positioned on the top of stem 214, and leg receptacle 226 that includes first and second leg receiving portions 228 and 230, respectively. First support assembly 200 also includes first corner piece 232 that further includes leg receiving portion 234, crossbar receiving portion 236, and foot 240; and second corner piece 242, that further includes leg receiving portion 244, crossbar receiving portion 246, and foot 248. First support assembly 200 also includes first leg 260, second leg 262, and crossbar 264.

As best shown in FIGS. 3-5, adjustable support bracket assembly 300, which is mounted on the bottom surface 404 of table top 400 (see FIG. 2), includes first inner support bracket portion 310 in which stem and flange receiving region 312 is formed, center support section 314, which includes structural rib 315, and locking edge 316. First outer support bracket portion 318, in which stem and flange receiving region 320 is formed, attaches to first inner support bracket portion 310 (by screws, bolts, rivets, or other non-permanent or permanent means) to enclose first pivot device 110 in a rotational manner (see arrow A in FIG. 2). Adjustable support bracket assembly 300, also includes second inner support bracket portion 330 in which stem and flange receiving region 332 is formed, center support section 334, which includes structural rib 335, and locking edge 336, which engages corresponding locking edge 316 when first and second inner support bracket portions 310 and 330 are in contact with one another. Second outer support bracket portion 338, in which stem and flange receiving region 340 is formed, attaches to second inner support bracket portion 330 (by screws, bolts, rivets, or other non-permanent or permanent means) to enclose second pivot device 210 in a rotational manner (see arrow B in FIG. 2). As shown in FIG. 5, adjustable support bracket assembly 300 can be separated into two distinct halves, which can be mounted on bottom surface 404 of table top 400 or on the bottom surface of any other type of platform. Under appropriate circumstances, increasing the distance between the two halves of adjustable support bracket assembly 300 and/or altering the placement of the two halves of adjustable support bracket assembly 300 relative to one another confers greater overall positional stability to a platform upon which adjustable support bracket assembly 300 is mounted. In other embodiments of this invention, adjustable support bracket assembly 300 is formed in a cross-like shape, wherein four rotating and pivoting leg assemblies may be attached to adjustable support bracket assembly 300. In still other embodiments, adjustable support bracket assembly 300 is configured to permit the support brackets and leg assemblies to fold inward for easier storage of the platform to which adjustable support bracket assembly 300 is attached. In still other embodiments, adjustable support bracket assembly 300 is mounted in a slidable manner on or in a track formed on the underside of the platform to which it is attached for easier separation and repositioning of the sections thereof.

While the present invention has been illustrated by the description of exemplary embodiments thereof, and while the embodiments have been described in certain detail, there is no intention to restrict or in any way limit the scope of the appended claims to such detail. Additional advantages and modifications will readily appear to those skilled in the art. Therefore, the invention in its broader aspects is not limited to any of the specific details, representative devices and methods, and/or illustrative examples shown and described. Accordingly, departures may be made from such details without departing from the spirit or scope of the general inventive concept.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

What is claimed:

1. An adjustable support bracket assembly, comprising:
   (a) a first section, wherein the first section includes:
      (i) a first inner support bracket, wherein the first inner support bracket further includes a stem and flange receiving region formed therein;
      (ii) a center support section formed integrally with the first inner support bracket, wherein the center support section further includes a first locking edge formed thereon opposite the first inner support bracket; and
      (iii) a first outer support bracket, wherein the first outer support bracket is adapted to be attached to the first inner support bracket, and wherein the first outer support bracket further includes a stem and flange receiving region formed therein; and
   (b) a second section, detachably connected to the first section, wherein the second section includes:
      (i) a second inner support bracket, wherein the second inner support bracket further includes a stem and flange receiving region formed therein;
      (ii) a center support section formed integrally with the second inner support bracket, wherein the center support section further includes a second locking edge formed thereon opposite the second inner support bracket; and
      (iii) a second outer support bracket, wherein the second outer support bracket is adapted to be attached to the second inner support bracket, and wherein the second outer support bracket further includes a stem and flange receiving region formed therein.

2. The adjustable support bracket assembly of claim 1, wherein each center support section further includes a lengthwise structural support rib.

3. The adjustable support bracket assembly of claim 1, wherein the first and second locking edges are adapted to engage one another.

4. The adjustable support bracket assembly of claim 1, further including two pivot devices mounted therein, wherein each pivot device is attached to a leg assembly, wherein each pivot device includes a flange and a stem positioned beneath the flange, and wherein each stem and flange corresponds to the stem and flange receiving portions of the inner and outer support brackets.

5. The adjustable support bracket assembly of claim 4, wherein each pivot device further includes a leg receiving portion positioned beneath the stem, and wherein the leg receiving portion is adapted to receive at least two legs therein.

6. The adjustable support bracket assembly of claim 4, wherein each leg assembly is triangular in shape and includes two legs and a cross bar positioned between the two legs.

7. The adjustable support bracket assembly of claim 1, wherein the inner support brackets are adapted to be attached to the outer support brackets in a permanent manner.

8. The adjustable support bracket assembly of claim 1, wherein the inner support brackets are adapted to be attached to the outer support brackets in a non-permanent, detachable manner.

9. The adjustable support bracket assembly of claim 1, wherein the adjustable support bracket assembly is manufactured from metal, plastic, or a combination thereof.

10. An adjustable support bracket assembly for use with self-leveling devices, comprising:
    (a) a first section, wherein the first section includes:
        (i) a first inner support bracket, wherein the first inner support bracket further includes a stem and flange receiving region formed therein;
        (ii) a center support section formed integrally with the first inner support bracket, wherein the center support section further includes a lengthwise structural support formed thereon and a first locking edge formed thereon opposite the first inner support bracket; and
        (iii) a first outer support bracket, wherein the first outer support bracket is adapted to be attached to the first inner support bracket, and wherein the first outer support bracket further includes a stem and flange receiving region formed therein; and
    (b) a second section, detachably connected to the first section, wherein the second section includes:
        (i) a second inner support bracket, wherein the second inner support bracket further includes a stem and flange receiving region formed therein;
        (ii) a center support section formed integrally with the second inner support bracket, wherein the center support section further includes a lengthwise structural support formed thereon and a second locking edge formed thereon opposite the second inner support bracket, and wherein the second locking edge is adapted to engage the first locking edge in a stable manner, and
        (iii) a second outer support bracket, wherein the second outer support bracket is adapted to be attached to the second inner support bracket, and wherein the second outer support bracket further includes a stem and flange receiving region formed therein.

11. The adjustable support bracket assembly of claim 10, further including two pivot devices mounted therein, wherein each pivot device is attached to a leg assembly, wherein each pivot device includes a flange and a stem positioned beneath the flange, and wherein each stem and flange corresponds to the stem and flange receiving portions of the inner and outer support brackets.

12. The adjustable support bracket assembly of claim 11, wherein the each pivot device further includes a leg receiving portion positioned beneath the stem, and wherein the leg receiving portion is adapted to receive at least two legs therein.

13. The adjustable support bracket assembly of claim 11, wherein each leg assembly is triangular in shape and includes two legs and a cross bar positioned between the two legs.

14. The adjustable support bracket assembly of claim 10, wherein the inner support brackets are adapted to be attached to the outer support brackets in a permanent manner.

15. The adjustable support bracket assembly of claim 10, wherein the inner support brackets are adapted to be attached to the outer support brackets in a non-permanent, detachable manner.

16. The adjustable support bracket assembly of claim 10, wherein the adjustable support bracket assembly is manufactured from metal, plastic, or a combination thereof.

17. The adjustable support bracket assembly of claim 10, wherein the inner support brackets are adapted to be attached to the outer support brackets in a permanent manner or in a non-permanent, detachable manner.

18. An adjustable support bracket assembly, comprising:
    (a) a first section, wherein the first section is metal or plastic and includes:
        (i) a first inner support bracket, wherein the first inner support bracket further includes a stem and flange receiving region formed therein;
        (ii) a center support section formed integrally with the first inner support bracket, wherein the center support section further includes a first locking edge formed thereon opposite the a first inner support bracket; and
        (iii) a first outer support bracket, wherein the first outer support bracket is adapted to be attached to the first inner support bracket, and wherein the first outer support bracket further includes a stem and flange receiving region formed therein; and
    (b) a second section, detachably connected to the first section, wherein the second section is metal or plastic and includes:
        (i) a second inner support bracket, wherein the second inner support bracket further includes a stem and flange receiving region formed therein;
        (ii) a center support section formed integrally with the second inner support bracket, wherein the center support section further includes a second locking edge formed thereon opposite the second inner support bracket; and
        (iii) a second outer support bracket, wherein the second outer support bracket is adapted to be attached to the second inner support bracket, and wherein the second outer support bracket further includes a stem and flange receiving region formed therein, and
    (c) two pivot devices, wherein each pivot device is attached to a leg assembly, wherein each pivot device includes a flange and a stem positioned beneath the flange, and wherein each stem and flange corresponds to the stem and flange receiving portions of the inner and outer support brackets.

19. The adjustable support bracket assembly of claim 18, wherein each pivot device further includes a leg receiving portion positioned beneath the stem, and wherein the leg receiving portion is adapted to receive at least two legs therein.

20. The adjustable support bracket assembly of claim 18, wherein each rotating and pivoting leg assembly is triangular in shape and includes two legs and a cross bar positioned between the two legs.

\* \* \* \* \*